Sept. 13, 1932.  T. C. FORBES  1,876,901
TOASTER
Filed April 7, 1930   2 Sheets-Sheet 1
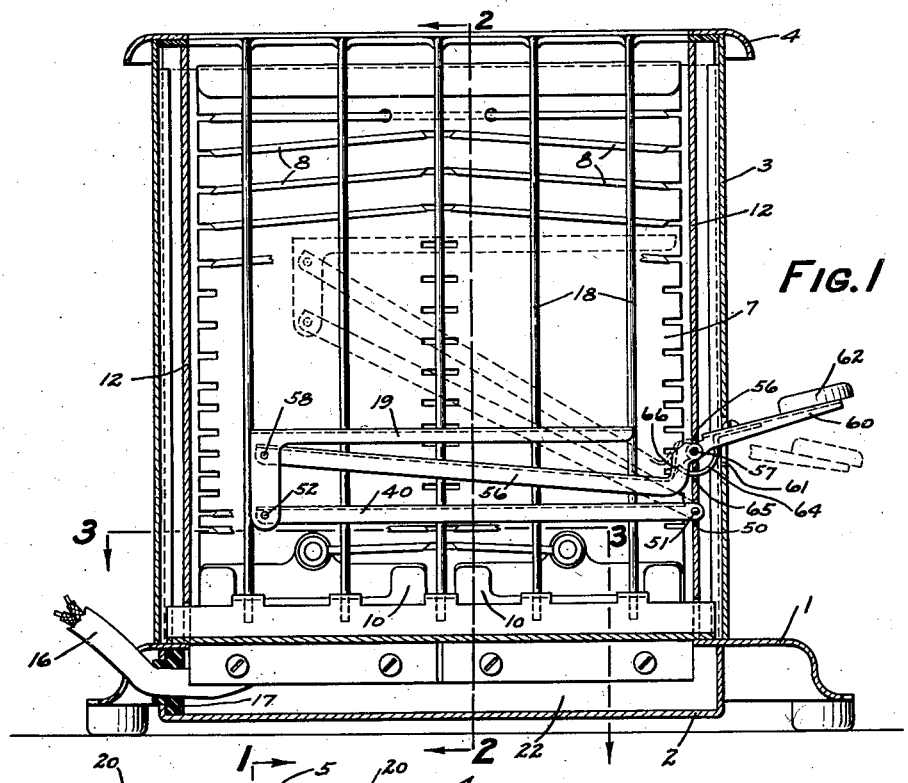
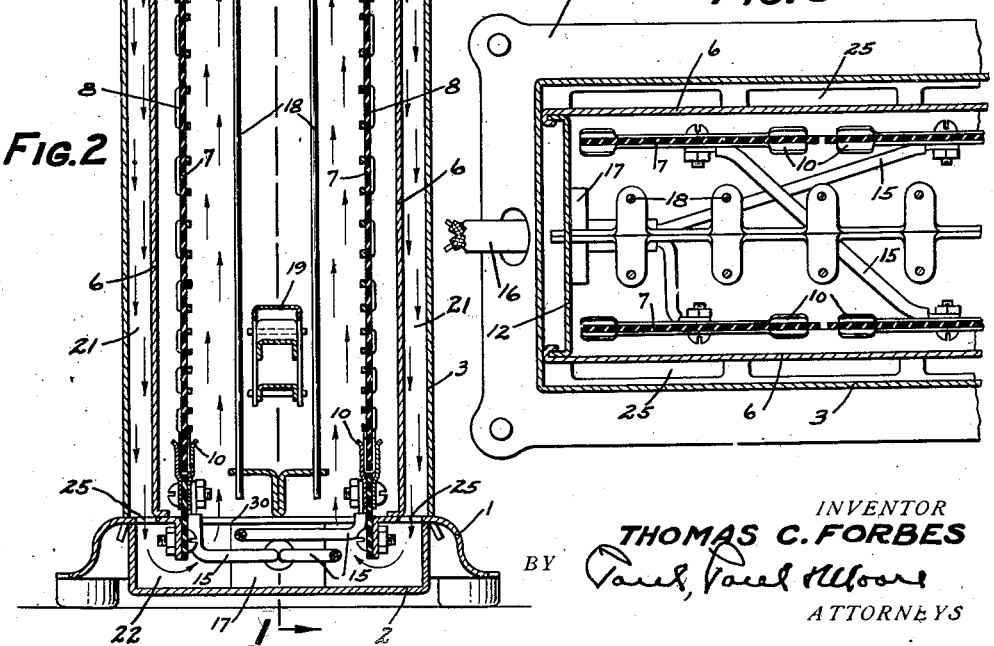
INVENTOR
THOMAS C. FORBES
BY
ATTORNEYS Sept. 13, 1932. T. C. FORBES 1,876,901
TOASTER
Filed April 7, 1930 2 Sheets-Sheet 2

INVENTOR
THOMAS C. FORBES
BY
ATTORNEYS

Patented Sept. 13, 1932

1,876,901

UNITED STATES PATENT OFFICE

THOMAS C. FORBES, OF MINNEAPOLIS, MINNESOTA, ASSIGNOR TO WATERS-GENTER COMPANY, OF MINNEAPOLIS, MINNESOTA, A CORPORATION OF MINNESOTA

TOASTER

Application filed April 7, 1930. Serial No. 442,388.

This invention relates to improvements in cookers and finds particularly valuable application in toasters, having electrically heated cooking chambers. Among other things, the invention provides means for reducing to a minimum the entrance of air into the cooking chamber, and provides means for circulating such air as is admitted, around the heating elements or element. In the embodiment illustrated herein, air is admitted by displacement only and must enter from the top of the cooking chamber proper. One of the accomplished objects is the conservation of heat and decrease in length of the toasting period. Ordinarily in devices of this kind, a continuous supply of outside air enters the toasting chamber, generally from the bottom, and passes upwardly therethrough. Because of the amount of heat required to heat this continual stream of cold air, more current is required and the length of the toasting period is increased. It is well known that quick surface heating gives a product which is much desired, because such quick heating does not unduly dry the body of the bread.

Features of the invention include, along with the broader ideas of means, all details of construction.

Features and advantages of the invention will be pointed out in the description of the drawings forming a part of this application, and in said drawings Figure 1 is a vertical longitudinal section substantially on line 1—1 of Figure 2;

Figure 2 is a vertical transverse section substantially on line 2—2 of Figure 1;

Figure 3 is a plan section substantially on line 3—3 of Figure 1;

Figure 4:
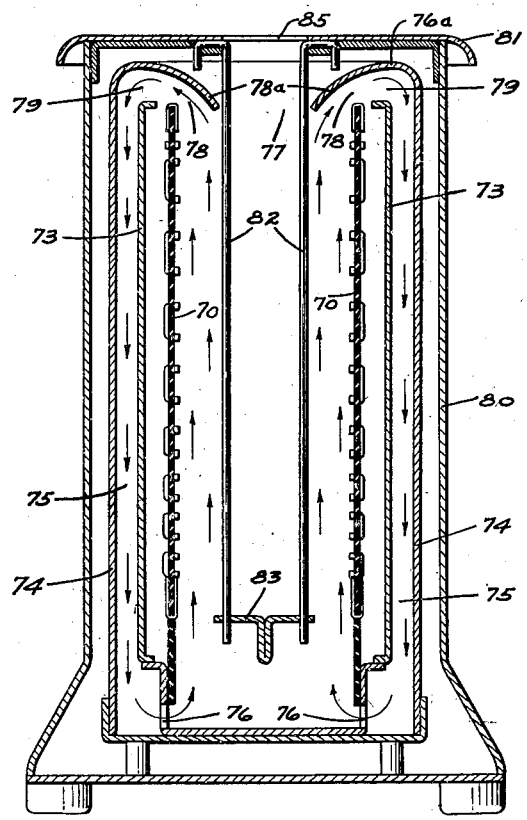
Figure 4 is a vertical transverse section illustrating another embodiment of the invention.

One embodiment of the present invention (see Figures 1 to 3) includes a hollow base 1, to the bottom side of which is attached a hollow element designated 2, the top of which is closed by the base 1 to form a substantially air-tight chamber. Upon the top of the base 1 is mounted an outer casing generally indicated at 3, the lower edge of which rests upon the top of the base. The top of this casing 3 is closed by a cover or top piece 4 which has a central elongated opening 5 therein, through which the article to be cooked (such as toast) can be introduced into the cooking chamber. This opening also admits air to the chamber and serves substantially as the sole means of entry of air. The casing 3 is attached to the base 1 and the top 4 by any suitable means not herein shown. Also attached to the base and spaced from the walls of the casing 3 are two partition elements indicated at 6. The vertical edges of these elements sealingly engage the corresponding walls of the outer casing 3, see Figure 3. These elements 6 are cross-connected adjacent their ends by wall forming elements 12. Spaced from these partition elements and between them are two supports 7 of mica or other suitable material, upon which the usual heating elements 8 are arranged. These supports are detachably secured at their lower ends by clips 10 suitably supported by the base 1 and electrically connected with power wires generally indicated at 15. It is desirable that the vertical edges of these heater supports be in close contact with walls 12. The power wires are arranged in a cable 16 which passes outwardly through a suitable air-tight insulating bushing 17, see Figure 1. It is necessary to the proper operation that air be admitted only through opening 5 or its equivalent, and to this end all parts are made substantially air-tight. Arranged between and spaced from the heating elements are a series of wires 18 which together form a grid for receiving the toast and spacing it from and preventing contact of it with the heating elements 8. A suitable support 19 is provided for the toast, and this support and its manner of operation, and its operating extension are among the features of the invention.

The main feature of the present invention is the arrangement and spacing of the partitions 6 to provide means whereby the air of the toasting chamber may be circulated, and the applied heat evenly distributed, without undue heat losses. For this purpose, the upper ends of the elements 6 are spaced from the top 4 to provide passages 20, which form continuations of passages 21 formed between the elements 3 and 6. These passages are continued beneath the upper wall of base 1 and through chamber 22 by means of openings 25 and 30 of the base. The toast receiving chamber proper, which is formed by the spaced supports 7 communicates with the chamber 22 through opening 30. Thus a complete air circulation path is established around each heating element, and upwardly through the cooking chamber.

It will be noted that the passages 20 prevent the trapping of heated air at the top of the toasting chamber. If air were trapped at this point in too great a quantity the article being cooked or toasted would burn, or the upper portion of the article would be cooked to a greater extent than the lower portion.

To thoroughly understand the present invention, as applied to toasters, it is necessary to discuss the actions of the ordinary types of toasters in which a continuous stream of cold air is admitted at the bottom of and passes upwardly through the toasting chamber. If, in this old type of toaster, the entrance of air is blocked at the bottom of the toasting chamber, the toast will burn at the top due to the collection of heated air. It is, therefore, important, after entrance of air is substantially preveneted, except through the opening 5, to provide some means whereby the air in the cooking chamber may be freely circulated, for the purpose of evenly distributing the applied heat therein. In the present system, this mixing or distribution takes place in substantially a closed air circulating system. It may be said that the air in the system is changed only by displacement through the opening 5 at the top. The path of the heated air is diagrammatically indicated by the arrows. It may be noted for the purposes of comparison, that the old type of toaster of the same size and capacity consumes at least a third more current and requires considerably more time for proper cooking. It is evident that with a through draft from the bottom to the top of the toaster, the air of the room is being unnecessarily heated. In the old draft type toaster with a current consumption of 660 watts, toast could be produced in about a minute. By the present device, the same quality of toast can be produced in about thirty-seven seconds.

Another feature of the invention, as before stated, relates to the rest 19 for holding the toast, and to means for operating it from an outside point, substantially without admitting any air into the cooking chamber. This rest is capable of vertical movement to eject the toast. It is operable by a lever which extends through one of the casings, and the manner of connection of this lever through one of the end walls 12, is a feature of this invention. The object of this construction is to have support-operating means accessible at the outside of casing 3, for ejecting the toast.

The toast support and ejector means includes lifting elements which are connected and operated in a manner to raise and lower the support 19, while at the same time maintaining its supporting surface in substantially horizontal position for all adjusted positions. A link 40 has one end snugly inserted in a narrow slot 50 of the end wall 12 of the toasting chamber, and a pivot 51 secures this end of the link in said slot. The pivot is substantially in the plane of the slot. The opposite end of the link is pivoted as at 52 to a vertical extension of the toast support 19, proper. A second link has one end snugly pivoted in a narrow slot 56 by means of pin 57 in substantially the same manner as the structure indicated by elements 50—51. The opposite end of this link is connected above the corresponding connection of the other link to the toast support at 58. The vertical distance between the pivots 52—58 and the pivots 51—57 is substantially equal. The distance between pivots 51—52 and 57—58 are substantially equal. Thus the pivots are related as the corners of a parallelogram. The result is that when force is applied to swing the links the upper surface of the support is always maintained in a horizontal position as shown in dotted lines in Figure 1. Although the pivot and slot connections at one end of the links and the pivot connections at the other have been described in the singular, as a matter of fact these pivots are arranged in pairs, so as to make the structure more rigid.

Pivoted to the pivot 57 is a thumb lever 60 which extends through a vertically elongated slot 61 of the casing 3. This lever has a suitable thumb piece 62. This lever also has an arcuate extension 64 which passes through a narrow slot 65 in the casing 12. The end of this extension engages a wall 66 of the link 56 in such manner that by depression of the lever, force is applied to the link 56 to lift the toast support. By the close-fitting of the ends of the links, and the lever and its extension in the slots 50, 56 and 64, entrance of air at this point into the heating chamber is substantially prevented.

Figure 5:
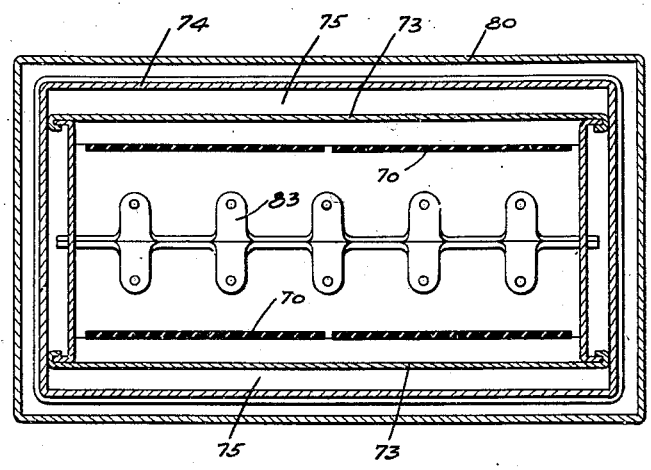
Figure 5 is a plan section of the form of the invention illustrated in Figure 4.

A modification of the invention is shown in Figures 4 and 5. In this modification, the heating element supports 70 are arranged in substantially the same manner as the elements 7. The faces of the supports 70 are spaced from the corresponding walls of the casing 73, which corresponds to the elements 6 and 12 previously described. Those walls of the casing 73 which are opposed to the heating element supports are in turn spaced from the corresponding walls of a casing 74, as shown in Figure 5. The costruction thus far is substantially the same as that previously described for the other form of the invention. The spacing just referred to provides vertical passages 75 corresponding to the vertical passages 21. The casing 73 has openings 76 below the bottoms of the supports 70, and the open top of the casing 73, is spaced downwardly from the top of the casing 74 to provide passages 79, communicating with passages 75. The tops of the supports 70 are also spaced downwardly from the top 76ª of the casing 74. The passages 78, 79, 75, 76 therefore, provide for the circulation of air around each heating element. The circulation is downward through the opening 76, then upwardly through the cooking chamber formed between the heating element supports 70. An opening 77 is provided in the top wall of chamber 74 and the wall is curved downwardly as shown at 78ª to form curved baffles tending to guide the air upwardly, and then laterally through the passages 78—79. The opening 77 is provided for introduction of the article to be cooked, and for the admission of air by displacement, during the cooking operation.

An outer casing 80 surrounds and is spaced from the casing 74 on all sides, see Figure 5, to form a kind of heat insulating space, adapted to reduce conduction and heat losses. This casing is provided with suitable removable top 81 to which are secured vertical grid members 82 spaced to receive the article to be cooked and having their lower ends suitably secured in a support 83. Any suitable means may be provided for raising this element 83 or some element the equivalent of 19 previously described.

This form of the invention also provides a substantially closed circulating system, wherein no outside air enters except by displacement through the openings 77 and 85. The circulation is diagrammatically indicated by the arrows and is substantially the same as for the previously described form of the invention.

All details of construction are claimed, along with the broader ideas of means.

I claim as my invention:

1. A device of the class described including a casing as a cooking chamber, a casing surrounding the cooking chamber and spaced therefrom, each of two opposed walls of said casings having slots, a support for the article to be cooked arranged within said cooking chamber and including links and pivots therefor, said links having portions snugly fitting, but capable of pivotal motion in certain of said slots, and a lever having a portion also snugly fitting within at least one of the slots in which the links are pivoted, and attached to one of the pivots, and passing through a slot of the outer casing, and having an extension also passing through one of the slots of the wall of the cooking chamber and engageable with one of the links in a manner to raise the same.

2. A casing having an opening at the top for the introduction of an article to be cooked, said opening constituting substantially the sole path for entry and egress of air, a food support arranged within the casing to receive food passed through the opening, partitioning heating element supports arranged one at each opposite side of the food support, and spaced from the support and corresponding casing walls, and having heaters on their inner sides, the tops and bottom of said supports being spaced from the corresponding casing walls to obtain circulation of air upwardly between the supports, and over the tops thereof, downwardly between said supports and the corresponding walls of the casing under the bottoms of said supports and upwardly between them.

3. A first casing having an opening at the top for the introduction of an article to be cooked, said opening constituting substantially the sole path for entry and egress of air, a food support arranged within the casing to receive food passed through the opening, partitioning heating element supports arranged one at each opposite side of the food support, and spaced from the support and corresponding casing walls, and having heaters on their inner sides, the tops and bottom of said supports being spaced from the corresponding casing walls to obtain circulation of air upwardly between the supports and over the tops thereof downwardly between said supports and the corresponding walls of the casing, under the bottoms of said supports and upwardly between them, and an outer casing surrounding the first and having walls spaced from the walls of the first and having a single opening in register with the opening of the first casing.

In witness whereof, I have hereunto set my hand this 4th day of April, 1930.

THOMAS C. FORBES.